(12) United States Patent
Artemenko et al.

(10) Patent No.: US 10,804,940 B2
(45) Date of Patent: Oct. 13, 2020

(54) MULTI-CHANNEL RADIO FREQUENCY MODULE WITH FREQUENCY DIVISION OF DATA RECEPTION AND TRANSMISSION

(71) Applicant: LIMITED LIABILITY COMPANY "RADIO GIGABIT", Nizhny Novgorod (RU)

(72) Inventors: Alexey Andreevich Artemenko, Nizhniy Novgorod (RU); Andrey Viktorovich Mozharovskiy, Nizhniy Novgorod (RU); Sergey Alexandrovich Tikhonov, Nizhegorodskaya obl. (RU); Roman Olegovich Maslennikov, Nizhniy Novgorod (RU)

(73) Assignee: LIMITED LIABILITY COMPANY "RADIO GIGABIT", Nizhny Novgorod (RU)

( * ) Notice: Subject to any disclaimer, the term of this patent is extended or adjusted under 35 U.S.C. 154(b) by 0 days.

(21) Appl. No.: 16/259,498

(22) Filed: Jan. 28, 2019

(65) Prior Publication Data

US 2019/0173500 A1    Jun. 6, 2019

Related U.S. Application Data

(63) Continuation of application No. PCT/RU2017/050063, filed on Jul. 27, 2017.

(30) Foreign Application Priority Data

Jul. 29, 2016    (RU) ................................ 2016131405

(51) Int. Cl.
*H04B 1/00*    (2006.01)
*H04B 7/155*   (2006.01)
(Continued)

(52) U.S. Cl.
CPC ............. *H04B 1/006* (2013.01); *H01Q 1/247* (2013.01); *H01Q 1/38* (2013.01); *H01Q 3/245* (2013.01);
(Continued)

(58) Field of Classification Search
CPC ........ H04B 1/006; H04B 1/00; H04B 1/0057; H04B 7/15542; H04B 7/1555;
(Continued)

(56) References Cited

U.S. PATENT DOCUMENTS 6,556,836 B2    4/2003  Lovberg et al.
7,834,803 B2   11/2010  Weinstein
(Continued)

FOREIGN PATENT DOCUMENTS

RU    2474045 C2    1/2013
RU    2530330 C1   10/2014
(Continued)

OTHER PUBLICATIONS

International Search Report with regard to PCT/RU2017/050063 dated Nov. 23, 2017.
(Continued)

*Primary Examiner* — Zhitong Chen
(74) *Attorney, Agent, or Firm* — BCF LLP

(57) ABSTRACT

The multi-channel radio frequency module with frequency division of data reception and transmission contains at least two radiating elements; at least two received signal filters and at least two transmitted signal filters, each of which is tuned to pass the received and transmitted signal accordingly in a certain frequency band; at least two radio frequency receivers, each of which is connected to the received signal filter; and at least two radio frequency transmitters, each of which is connected to the transmitted signal filter. Radiating elements having two input ports; one of which is connected
(Continued)

to the received signal filter, and the other to the transmitted signal filter, the passbands of these filters being non-overlapping. Application of the invention allows the miniaturization of the microwave PtP communication station while simultaneously providing efficient electronic beam scanning with small signal loss for beam switching and high isolation between receivers and transmitters.

20 Claims, 13 Drawing Sheets

(51) Int. Cl.
| | |
|---|---|
| H04L 5/18 | (2006.01) |
| H01Q 3/24 | (2006.01) |
| H01Q 19/06 | (2006.01) |
| H01Q 19/10 | (2006.01) |
| H01Q 1/24 | (2006.01) |
| H01Q 1/28 | (2006.01) |
| H04B 7/06 | (2006.01) |
| H01Q 25/00 | (2006.01) |
| H01Q 21/06 | (2006.01) |
| H04B 7/00 | (2006.01) |
| H01Q 1/38 | (2006.01) |

(52) U.S. Cl.
CPC ............ *H01Q 19/06* (2013.01); *H01Q 19/10* (2013.01); *H04B 1/00* (2013.01); *H04B 1/0057* (2013.01); *H04B 7/1555* (2013.01); *H04B 7/15542* (2013.01); *H04L 5/18* (2013.01); *H01Q 21/065* (2013.01); *H01Q 25/001* (2013.01); *H04B 7/00* (2013.01); *H04B 7/0617* (2013.01)

(58) Field of Classification Search
CPC ........ H04B 7/0617; H01Q 1/247; H01Q 1/38; H01Q 3/245; H01Q 19/06; H01Q 19/10; H04L 5/18
See application file for complete search history.

(56) References Cited

U.S. PATENT DOCUMENTS

| 7,844,217 | B2 | 11/2010 | Charash | |
|---|---|---|---|---|
| 8,090,411 | B2 | 1/2012 | Korevaar et al. | |
| 2010/0157858 | A1* | 6/2010 | Lee | H01Q 9/40 370/297 |
| 2014/0111392 | A1* | 4/2014 | Ou | H01P 1/20 343/767 |
| 2014/0133103 | A1* | 5/2014 | Nakamura | H01L 23/3735 361/712 |
| 2016/0233942 | A1* | 8/2016 | Ling | H04B 7/18517 |
| 2016/0380682 | A1* | 12/2016 | Sienkiewicz | H04B 7/0413 375/267 |
| 2018/0138927 | A1* | 5/2018 | Nagumo | H04B 1/0057 |

FOREIGN PATENT DOCUMENTS

| RU | 2585309 C2 | 5/2016 |
|---|---|---|
| RU | 2586503 C1 | 6/2016 |
| WO | 2003/013163 A1 | 2/2003 |
| WO | 2013/058673 A1 | 4/2013 |

OTHER PUBLICATIONS

Macchiarella et al., "Design of Triplexer Combiners for Base Stations of Mobile Communications", Proc. of IMS, 2010, pp. 429-432.
Lai, "Practical Digital Signal Processing for Engineers and Technicians", Elsevier Ltd, 2004, pp. 14-49.
Wikipedia, "Reconstruction filter", https://en.wikipedia.org/wiki/Reconstruction_filter, pdf 4 pages.
Wikipedia, "Anti-aliasing filter", https://en.wikipedia.org/wiki/Anti-aliasing_filter, pdf 3 pages.
"Explications sur les filtres antirepliement et leur utilisation", National Instruments, https://www.ni.com/ru-ru/innovations/white-papers/18/anti-aliasing-filters-and-their-usage-explained.html, pdf, 3 pages.
Marshall, "Getting into Digital Signal Processing Part 3: DACs and Reconstruction", Designspark, https://www.rs-online.com/designspark/getting-into-digital-signal-processing-dacs-and-reconstruction, pdf, 8 pages.

* cited by examiner

MULTI-CHANNEL RADIO FREQUENCY MODULE WITH FREQUENCY DIVISION OF DATA RECEPTION AND TRANSMISSION

CROSS-REFERENCE

The present application is a Continuation of PCT/RU2017/050063, filed on Jul. 27, 2017, entitled "MULTI-CHANNEL RADIO FREQUENCY MODULE WITH FREQUENCY SEPARATION BETWEEN RECEIVE AND TRANSMIT", which claims convention priority to Russian Patent Application 2016131405, filed on Jul. 29, 2016, the entirety of which is incorporated herein by reference.

FIELD OF THE TECHNOLOGY

The non-limiting embodiments of the present technology relate to the field of wireless communication systems operating in a full-duplex mode for receiving and transmitting data, in particular, to multi-channel radio frequency modules for high data rate communication devices with electronic beam scanning. One of the main applications of those radio frequency modules is the millimeter-wave radio-relay communication devices with electronic beam scanning.

BACKGROUND

The operation frequency of modern wireless communication systems is constantly shifting to shorter wavelengths, that is primarily due to significant progress in the development of high frequency integrated circuits. Recently special attention has been attracted to the development and creation of new devices and radio communication systems in the millimeter wavelength range. Currently wireless communication systems have been already introduced in the frequency range from 30 GHz to 100 GHz for indoor local area networks (WI-FI systems), automotive anti-collision radars, microwave imaging systems to detect hidden objects, microwave point-to-point (PtP) and point-to-multipoint (PtMP) communication systems with high data throughput (more than 1 Gb/s) over long distances (up to 3-5 km), etc.

For the most of these applications, especially for microwave PtP and PtMP systems, high gain antennas are required. It can be explained by the necessity to compensate large signal attenuation in free space at large distances and specific absorption of millimeter-wave radiation by atmospheric gases, and also additional radiation scattering in free space in case of precipitations.

Typical gain values of PtP antennas for 57-64 GHz and 71-76/81-86 GHz frequency ranges are from 34 dBi up to 50 dBi and higher. Accordingly, the beamwidth of such highly directional antennas is only 1-3 degrees, and in some cases even less than 1 degree. Because of such narrow beam the initial alignment of antennas to each other are quite difficult especially in case of imperfectly rigid bearing structures which can have angular deviations and twists comparable in magnitude to the beamwidth of the antenna, and arising due to external influences such as wind, compression/expansion of materials during heating/cooling cycles, all kinds of vibrations, etc.

These difficulties make it extremely urgent to develop efficient highly directional antennas with high gain and with the option of electronic beam position control in a certain angular sector. Such antennas will allow to significantly facilitate alignment procedure using automatic beam tuning and compensate dynamic swings and twisting of the bearing structures in real time without any data losses. It is clear that the use of classical antenna arrays to solve such a problem is inefficient, because It is necessary to have a huge number of elementary radiators (it means a huge number of phase shifters also) to provide the required gain. It's expensive, technically difficult and not practical in terms of the need for calibration of all the array elements.

Therefore, the most effective for use in PtP and PtMP systems are the large aperture antennas that switch beam direction between predetermined positions. Such switching in a classical design is carried out by high-frequency switching circuits which are connected to an array of primary radiating elements of any aperture antenna (for example a reflector or a lens). A microwave point-to-point system comprising such an antenna is described in Russian Federation patent #2585309 "System and Method of Relay Communication with Electronic Beam Adjustment". The system described in this application consists of two transceiver units, each one containing an antenna capable for electronic beam position switching. Utilization of such scanning antenna in microwave PtP stations assumes that there is the switching circuit, which distributes the signal from a single transceiver to one of the primary radiating elements. The general structure of the described system is shown in FIG. 1.

Significant drawback in such scanning systems is additional losses associated with the high-frequency switching circuit which consists, in general case, in one or more semiconductor switches. The losses in semiconductor switches increase with increasing its operating frequency due to technological constraints. It can be demonstrated by analyzing commercially available switches of different frequency bands. Existing N position switches for frequency bands around 60 GHz and higher introduce losses approximately equal to $0.7 \div 1.5 * N$ dB. For example, the losses of the 4 positions switch TGS4306-FC from Qorvo (earlier Triquint Semiconductors) is more than 3 dB (so, because of switching at least half a power is lost). In additional the losses caused by switch implementation in a switching circuit (for example on a printed circuit board) should be considered, these losses are usually about 1 dB. These losses are duplicated on the receiver side of the radio relay system. This causes significant attenuation of the transmitted signal and, therefore, reduces the maximum distance of the signal transmission by more than 2 times.

In order to eliminate these losses of the switching between beam positions another microwave PtP station was introduced in the Russian Federation patent #2530330 "Radio Relay Communication System with Beam-Scanning Antenna" (FIG. 2). It comprises the beam-scanning antenna with at least two primary antenna elements, at least two radio frequency transceiver units and each unit is connected with at least one primary antenna element, received signal distribution unit connected to radio frequency transceiver units, transmitted signal distribution unit connected to radio frequency transceiver units, modem with modem reception part and modem transmission part, and a beam control unit, which is connected to modem reception part and modem transmission part of the modem through supervisory channels and to the received signal distribution unit and the transmitted signal distribution unit through control channels, thus enabling supply of beam control signals to them. The received and transmitted signal distribution units are connected respectively to the modem reception part and modem transmitted part and used to supply received and transmitted signals from active radio frequency transceiver unit to and from the modem.

Reduction of beam switching losses in this microwave PtP station is provided by the presence of at least two radio frequency units. Thus, the received and transmitted signal distribution units are used to select at least one radio frequency unit for processing the received and generating the transmitted signals in the specified directions. The structure of such microwave station with beam-scanning antenna assumes that distribution of the received and transmitted signals is maid between radio frequency units either in intermediate or baseband frequency (before upper conversion the transmitted signal on the carrier frequency or after down conversion the signal from the carrier frequency) or in the digital domain. This allows to implement distribution blocks with a much smaller (down to negligible) loss level in comparison with the switching schemes of the millimeter wavelength range considered earlier.

Described in the Russian Federation patent #2530330 microwave PtP and PtMP station with low losses in signal distribution units allows to provide electronical beam-scanning with the gain of each beam approximately equal to the antenna gain of the station without the scanning option. It provides effective electronical beam scanning without additional losses.

Specific structures of radio frequency units are disclosed in specific embodiments of the microwave PtP station according to the Russian Federation patent #2530330 depending on the type of duplexing (separation) of signal reception and transmission. The most promising is the case of frequency division duplexing, where the reception and transmission of data by single microwave station are performed in various non-overlapping frequency bands, as shown in FIG. 3. In this case the data rates from the station and to the station are equal, and the reception and transmission are carried out simultaneously. The structure of each radio frequency unit with receive and transmit frequency duplexing in accordance with this disclosure is shown in FIG. 4. It contains of a receiver and a transmitter, filters of the receive and transmit signals, which connected to the radio frequency receiver and transmitter, and also a splitter of the signal from a common antenna element. The main drawback of such radio frequency unit structure is high requirements to isolation in the duplexing filters. This isolation is required to suppress leakage of the transmitter main signal and also transmitter out-of-band noise into the receiver chain, in order to not interfere with the weak received signal. In the microwave PtP systems the required isolation levels are from 50 dB to 100 dB typically. Because of such high requirements, there are restrictions on the choice of technology for the practical implementation of filters. In fact, there is only one way to implement these filters: it is the technology of metal rectangular waveguides with coupled resonators implemented by inhomogeneities in the waveguide channel Such waveguide filters are manufactured on CNC milling machines with high accuracy. Moreover, the accuracy and the tolerances for the overall dimensions of the resonators in the waveguide channel become very important because the electrical characteristics of the filters, in particular, the isolation, degrade when the dimensions are inaccurate. Filters on metal waveguides with air filling provide minimum level of transmission loss when the required isolation is achieved.

The problem is aggravated by the fact that the microwave PtP structure considered in Russian Federation patent #2530330 includes several radio frequency units and, hence, the same number of pairs of filters of the received and transmitted signal. Essentially, there is a problem of practical implementation of the multi-channel duplexing device (diplexer, in case of frequency division duplexing method) with multiple inputs and outputs. Implementation of such a device using metal waveguides is ineffective due to their large size and weight, as well as the high cost of manufacturing and the sensitivity to the inaccuracy of manufacturing. A specific example of a triplexer (one input and three outputs, it means there are three filters) is considered in the article "Design of Triplexer Combiners for Base Stations of Mobile Communications" written by G. Macchiarella H S. Tamiazzo, published in proc. of IMS 2010. There is a complex multi-cavity structure of each filter having large dimensions nevertheless they are slightly reduced due to the zigzag-shaped waveguide channel It is apparent for the mentioned reasons, that further increase of the channel number is ineffective, but it is extremely necessary for the implementation of a microwave PtP station with electronic beam scanning without losses.

In addition, in this section of the description, it is necessary to consider some known configurations of scanning antennas that can be used in a PtP communication system. U.S. Pat. No. 7,834,803 described a Cassegrain antenna with electron beam scanning. The proposed construction includes a Cassegrain antenna (or any other type of antenna with a separated feed) and an array of switchable horn antennas performing the function of primary radiating elements. It is mentioned that the antenna can operate as a classical scanning antenna with a high-frequency switch between a single radio frequency block and radiators.

In Russian Federation patent #2586503 another option of the scanning antenna is described. This is an integrated lens antenna in which an array of primary radiating elements is mounted directly on a flat surface of a lens forming a narrow beam upon excitation of each element. The arrangement of the radiating elements on the surface of the dielectric lens distinguishes the integrated lens antennas from other types of lens antennas, such as horn-lens antennas, Fresnel lenses, thin (in comparison with the focal length) lenses with separated primary radiators from the focusing device.

Both considered antennas can be used in the prototype communication station under Russian patent #2530330, which is using multi-channel radio frequency module. However, it requires multi-channel diplexer implementation with several filters equal to twice a number of the primary radiating elements and with appropriate splitters. It was mentioned earlier that in this case filters requirements are usually so high that it should be implemented using metallic waveguide technology. And this, in turn, will lead to large dimensions of the communication station as well as to sensitivity to any manufacturing inaccuracy (and hence to a decrease in yield) and, consequently, to an increase in its prime cost.

Consequently, the problem arises of developing an efficient multi-channel radio frequency module with frequency division duplexing of reception and transmission for the use in microwave PtP stations with electronic beam scanning, which makes the station more compact and lighter, and its blocks more technologically efficient from the manufacturing point of view.

SUMMARY

The object of the non-limiting embodiments of the present technology is to provide an efficient multi-channel radio frequency module with frequency division of data reception and transmission for use in microwave PtP station with electronic beam scanning.

The technical advantage of the non-limiting embodiments of the present technology consists in miniaturization of the microwave PtP communication station providing efficient electronic beam scanning with small beam switching losses of the signal and high isolation between receivers and transmitters.

This advantage of the non-limiting embodiments of the present technology is achieved by using the developed multi-channel radio frequency module with frequency division of data reception and transmission that is comprised in at least two radiating elements; at least two received signal filters each tuned to pass the received signal in the certain frequency band; at least two transmitted signal filters each tuned to pass the transmitted signal in the certain frequency band; at least two radio frequency receivers each connected to the received signal filter, and at least two radio frequency transmitters each connected to the transmitted signal filter, wherein each of the radiating elements has two input ports; one of which is connected to the received signal filter, and another one to the transmitted signal filter, and the passbands of these filters are not overlapping.

The radiating element with two ports assumes planar implementation, which allows considering the planar implementation of filters as well. Such an implementation provides a technical advantage in terms of reduction of overall dimensions and weight, as well as simplification of the practical implementation of the microwave PtP station.

In a specific embodiment, all the filters of the received signal and the transmitted signal are made using the technology of planar waveguides. This technology makes it possible to implement the structures of coupled resonators with high quality factor in a dielectric board.

In another specific embodiment, all filters and all radiating elements are made on one high-frequency dielectric board. This ensures ease of manufacture and eliminates the need of high-frequency connections between the elements of the module. Such connections, if they are necessary, usually cause significant losses. In particular, when classical metal filters are used, it often requires a transition from a waveguide to some planar line on a board, on which semiconductor components are mounted. In accordance with the non-limiting embodiments of the present technology, such transitions are not required.

In one of the more specific embodiments, the high frequency dielectric board has at least two metallization layers. In another embodiment, it contains at least three metallization layers. The using of multi-layer boards is often mandatory in modern electronic devices since it allows reducing the size and weight and also more effectively implement some passive blocks.

In various specific embodiments, low-temperature or high-temperature ceramic or standard printed circuit boards are used as a high-frequency dielectric board. Accordingly, the manufacture of boards in these cases implies the use of standard technologies for the production of ceramic boards or printed circuit boards, the materials of which are composite or even simply thermoplastics with an adhesive base.

In one embodiment, the radio frequency receivers and transmitters are implemented as at least one semiconductor integrated circuit mounted on the dielectric board. Such integrated circuits perform various special functions of radio frequency transformations of a signal—amplification, attenuation, change of the frequency, etc.

In another embodiment, each radio frequency receiver is implemented on one semiconductor integrated circuit, and also each radio frequency transmitter is implemented on a single semiconductor integrated circuit. In this case, integrated circuits with higher level of integration are used so all necessary functions of the receiver or transmitter are performed by only one integrated circuit (with the exception of the simple necessary external elements and the reference signal generator). The advantage of the approach is the simplicity and compactness of the radio frequency module.

Another one embodiment is wherein a pair of radio frequency receiver and transmitter are implemented on one semiconductor integrated circuit forming the transceiver. Such components in the millimeter wavelength range are the actual state-of-the-art. In addition, only a quartz reference signal generator with a phase-locked loop system and, in some cases, analog baseband amplifiers to provide a wide dynamic range of the receiver are required.

In one embodiment of the multi-channel module, the radiating elements are dual-polarized elements, and each of the two ports of each element used to transmit or receive signals on essentially orthogonal polarizations. In this case, an additional technical advantage is provided in the form of relaxing the requirements for the isolation of duplex filters. This is achieved due to the available isolation between two orthogonal polarizations, which is subtracted from the requirements for filters. In this case, the planar realization of the filters becomes more practical, since even on standard high-frequency substrates it is possible to provide small transmission losses.

In various specific embodiments, the module contains either a parabolic mirror, and the radiating elements are arranged substantially in the focal plane of the mirror; or a thin dielectric lens, and the radiating elements are located substantially in the focal plane of the lens; or a lens with a cylindrical extension, and the radiating elements are located substantially in the focal plane of the lens, and the dielectric board is mounted on the flat surface of the cylindrical lens extension. Any one of the listed or other similar focusing elements provides a predetermined beam direction selected by the microwave PtP station, depending on which of the radiators are active at each particular moment.

In more specific embodiments, the collimating shape of a lens with a cylindrical extension is a hemi-ellipsoid or a hemisphere.

In one embodiment, the passband of all received signal filters is substantially the same, and also the passband of all transmitted signal filters is substantially the same. In this case, it is a classical duplex communication with a frequency diversity of the transmitted and received signals so that the receiving and transmitting frequencies stay the same when the beam direction is changed. If filters passband for receiving or transmitting are not equal, then frequency-angular scanning of the beam is provided, and each beam direction corresponds to its unique frequency channel for receiving and transmitting data. It is effective, for example, for communicating with several objects, or to facilitate the beam adjustment in the required direction to the reciprocal station.

In one embodiment, connection of the radiating elements and filters is performed by microstrip transmission lines using appropriate transitions between a line and a substrate waveguide. Such transitions are usually very simple because of the main electromagnetic mode configurations of these two transmission lines are quite similar.

In more specific embodiments, the radiating elements are located at the vertices of the triangle or at the corners of the rectangle. In these cases, respectively, three or four radiating elements are used, and scanning is possible in two angular coordinates: both in azimuth and in elevation. It is obvious that any other two-dimensional arrangements of the radiating elements are also possible.

In other more specific embodiments, the radiating elements are either microstrip antennas with a direct signal feeding by a microstrip line; or microstrip antennas with a signal coupling from the microstrip line through a slot aperture in a ground shield located between the radiating element and the transmission lines; or microstrip antennas with a signal feeding by a microstrip line by means of via holes through the ground plane located in between the radiating element and the transmission lines. In addition to microstrip antennas, any other planar radiators can be used, which can be implemented in a configuration with two ports (for example, dipoles, slit dipoles, slit antennas, etc.), in some embodiments, radiators with two polarizations. However, microstrip radiators are the most practical for the non-limiting embodiments of the present technology because of their compactness and because of the signal is fed to them using a microstrip line which is the most common in modern microwave electronics.

In another embodiment, the multi-channel radio frequency module additionally contains a received signal distribution block connected to the radio frequency units and a transmitted signal distribution block connected to the radio frequency units, wherein the beam position control module is connected to the digital modem and to the received signal distribution block and the transmitted signal distribution block through the command channels with an option to sending command signals to them. These distribution blocks allow the distribution of the signal power in the required manner to activate one or more channels of the radio frequency module. And to send commands to the distribution blocks and select an active channel, the digital modem of the microwave PtP station generates command signals and sends it through the command channels.

In a more specific embodiment, the received signal distribution block is a power divider for N outputs, and the transmitted signal distribution block is a power combiner with N inputs. In this case, the activation of the channels can also be initiated by sending command signals to radio frequency receivers and transmitters. These signals can command, for example, the gain of the receivers and transmitters to suppress unnecessary channels at this particular moment.

In another particular embodiment, the received signal distribution block and the transmitted signal distribution block are multi-channel switches. In this case, the active channel is selected by simply electrically disconnecting all the others.

BRIEF DESCRIPTION OF THE DRAWINGS

Details, features, and advantages of the non-limiting embodiments of the present technology follow from the following description of some embodiments of the claimed technical solution and the drawings:

Next reference numbers are used in the figures:

1000—a microwave PtP station; 100—a multi-channel radio frequency module; 110—a radio frequency unit; 120—lens; 130—a received signal distribution block; 140—a transmitted signal distribution block; 150—a radiating element with two ports; 160—a radiating element with one port; 111—a radio frequency receiver; 112—a radio frequency transmitter; 113—a received signal filter; 114—a transmitted signal filter; 115—a radio frequency transceiver; 170—a diplexer; 171—a splitter; 180—a high frequency switching block; 200—a digital modem; 210—a demodulator; 220—a modulator; 230—a beam position control module; 310—an analog to digital converter (ADC); 320—a digital to analog converter (DAC); 330—command channels; 240—a control channel; 151—a microstrip line; 152—a grounded conducted shield; 153—slot apertures in the ground plane; 154—via holes in the structure of the radiating element; 155—a top metallization layer; 156—a bottom metallization layer; 157—via holes forming substrate waveguide; 158—resonators in the structure of a substrate waveguide; 159—a transition from a microstrip line to a substrate waveguide.

DETAILED DESCRIPTION OF THE NON-LIMITING EMBODIMENTS OF THE PRESENT TECHNOLOGY

The non-limiting embodiments of the present technology may be better understood from the following description of some implementations of a multi-channel radio frequency module with a receive and transmit frequency division using adaptation examples for use in high-speed point-to-point radio relay communication systems of the millimeter wavelength range.

The developed multi-channel radio frequency module provides a more compact implementation of a microwave point-to-point communication station with electronic beam scanning and, in special cases, allows to simplify requirements for frequency duplexing filters. Consequently, these filters can be implemented not only with the classical technology of metal waveguides, but also with the technology of planar waveguides. That makes it possible to exclude all metal elements (requiring expensive precision machining using milling equipment and having large size and weight) from the microwave station. All these lead to miniaturization of the microwave communication station and reduction of its cost. Due to simplified requirements to the filters, there is no degradation of the electrical characteristics of the microwave communication station. Moreover, with the improvements of manufacturing technologies and the materials for printed and ceramic boards for modern electronics, some features may even be improved due to the reduction of losses in the microwave and antenna-feeder path.

Figure 1:
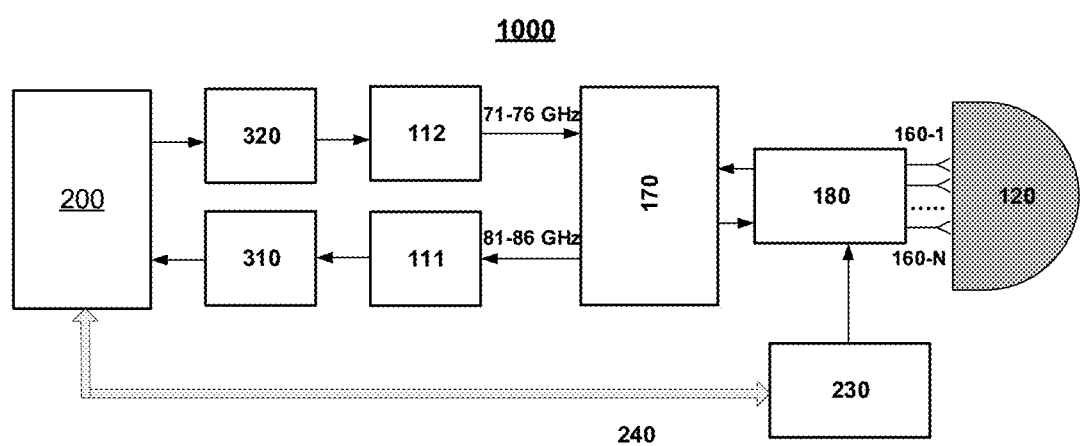
FIG. 1 illustrates a functional diagram of a known radio relay "point-to-multipoint" communication station (prior art)
Figure 2:
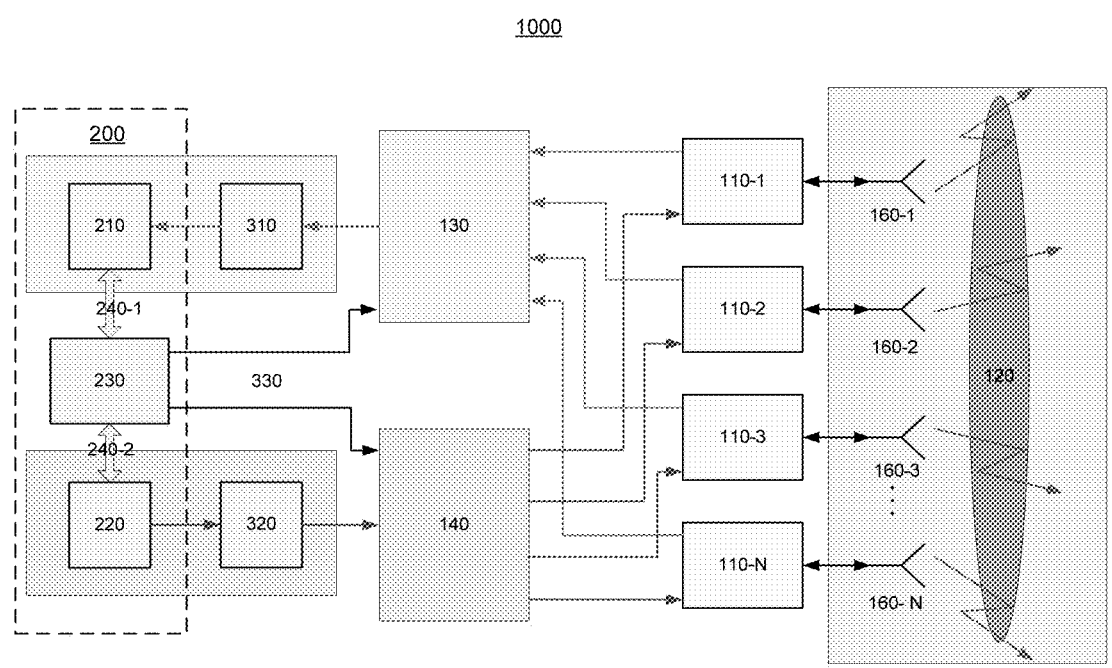
FIG. 2 illustrates a functional diagram of a radio relay communication station with a received signal distribution block and a transmitted signal distribution block operating at an intermediate frequency (prior art)
Figure 3:
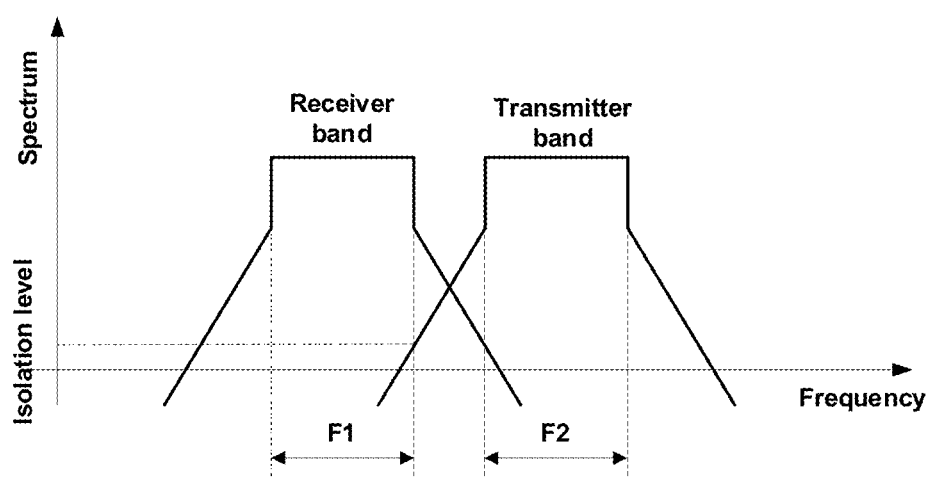
FIG. 3 shows a non-overlapping frequency bands of transmitted and received signals in a communication system with frequency division duplexing.
Figure 4:
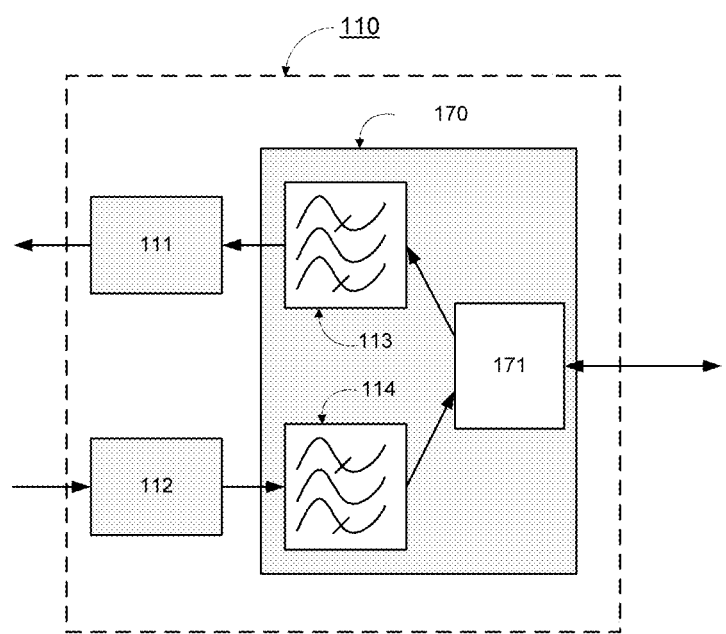
FIG. 4 illustrates a functional diagram of the radio frequency module for radio relay communication station with frequency division duplexing of data reception and transmission (prior art)
Figure 5:
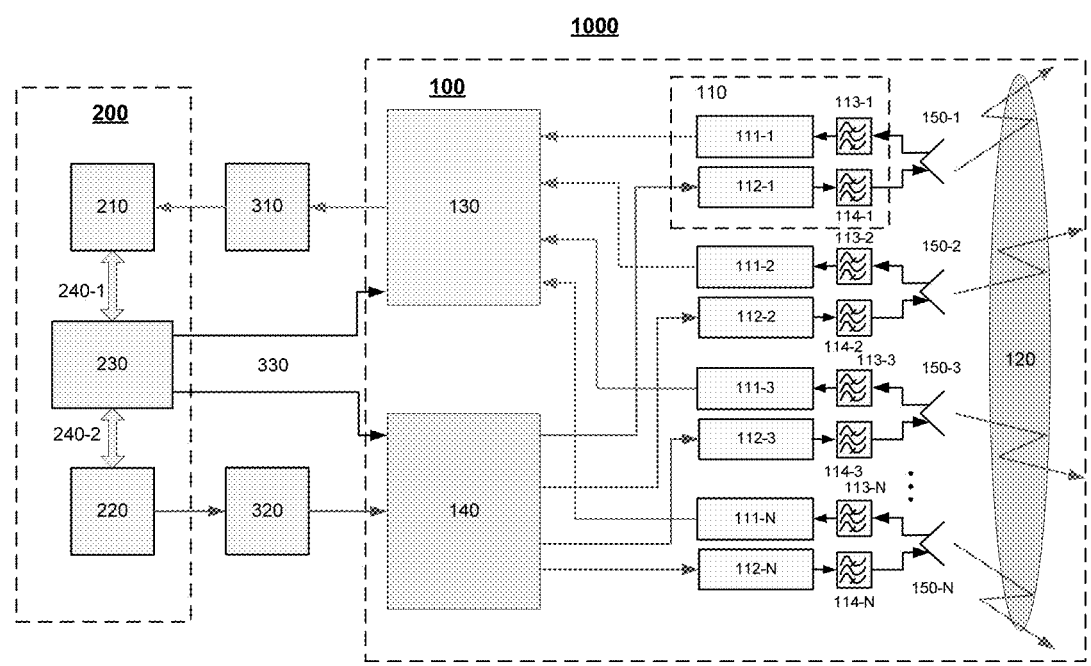
FIG. 5 illustrates a functional diagram of a radio relay communication station with a multi-channel radio frequency module with frequency division duplexing of data reception and transmission in accordance with one embodiment of the non-limiting embodiments of the present technology.

FIG. 5 shows a functional diagram of a microwave PtP station (1000) with an electronic beam scanning containing a multi-channel radio frequency module (100) with frequency duplexing of receive and transmit signals constructed in accordance with one embodiment of the non-limiting embodiments of the present technology. The multi-channel radio frequency module (100) contains a number of radio frequency receivers (111-1 ... 111-N) and a number of radio frequency transmitters (112-1 ... 112-N). Radio frequency receivers (111) are connected to the received signal filters (113-1 ... 113-N) configured to transmit signals only in the receiving frequency band. Radio frequency transmitters (112) are connected to the transmitted signal filters (114-1 ... 114-N) configured to transmit signals only in the transmission frequency band. Radio frequency receivers (111), radio frequency transmitters (112), and received signal filters (113) and transmitted signal filters (114) are functionally integrated into radio frequency units (110). Also, the multi-channel radio frequency module (100) contains radiating elements with two ports (150-1 ... 150-N). Each of the radiating elements with two ports (150) has two input ports, one of which is connected to the received signal filter (113) and the other to the transmitted signal filter (114). At each time moment, only one of the radiating elements with two ports (150) is active, while all of them are located substantially in the focal plane of the lens (120) which provides a predetermined tilt of the main beam of the radiation pattern depending on the displacement of the particular radiating element relatively to the lens axis. This property of the lens is also illustrated schematically in FIG. 5 by arrows showing the direction of radiation from the lens (120). In order to select an active radiating element with two ports (150) in this embodiment the multi-channel radio frequency module (100) also contains a received signal distribution block (130) and a transmitted signal distribution block (140). These blocks are connected to radio frequency receivers (111-1 ... 111-N) and radio frequency transmitters (112-1 ... 112-N), respectively.

Also, FIG. 5 shows some of the other elements of the microwave PtP station (1000) needed for better understanding of its operation and operation of the multi-channel radio frequency module (100) as a main part of the station. These elements are a digital modem (200) that contains a digital signal demodulator (210), a digital signal modulator (220), and a beam position control module (230) that serves to generate and transmit command signals to the received signal distribution block (130) and the transmitted signal distribution block (140). The command signals are transmitted from the beam position control module (230) to the received signal distribution block (130) and the transmitted signal distribution block (140) via the command channels (330) and serve to inform the received signal distribution block (130) and the transmitted signal distribution block (140) about a particular radio frequency unit (110) selected for processing of received and transmitted signals. The beam position control module (230) is also connected inside the modem (200) to the demodulator (210) and the modulator (220) via the control channels (240) from which it receives the information about the quality of communication and other parameters. Accordingly, with this information, the beam position control module (230) decides whether to switch the beam or not.

Between the multi-channel radio frequency module (100) and the digital modem (200), blocks of an analog-to-digital converter (310) and a digital-to-analog converter (320) are included. They serve to convert signals from analog to digital domain and vice versa.

Figure 6:
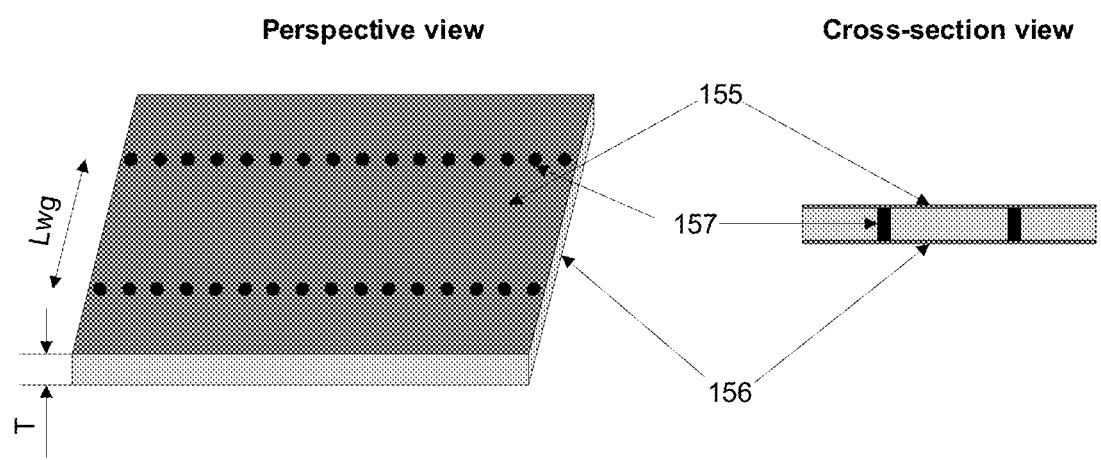
FIG. 6 illustrates a structure of a planar waveguide implemented on a dielectric board (prior art)

The main advantage of the disclosed multi-channel radio frequency module is achieved when planar technologies are used for its implementation. The most effective is the technology of substrate integrated waveguides that is a type of planar waveguides. The structure of the substrate integrated waveguide implemented on the dielectric board is shown in FIG. 6. The substrate waveguide is a rectangular waveguide formed in the printed circuit board structure by means of a top metallization layer (155) and a bottom metallization layer (156) and two parallel rows of via holes forming substrate waveguide (157) with a small distance between them to avoid leakage of the waves propagating along the waveguide.

Thus, the substrate waveguide is a waveguide with dielectric filling, and its most important competitive advantage is in the implementation on the printed circuit boards that are standard, cheap and suitable for mass production technologies. The structure of such a waveguide can be made, for example, on any printed circuit board (including multilayer) between any two metallization layers. The length Lwg and the width T (equal to the thickness between the two metallization layers on the board) of the substrate waveguide cross-section determine critical frequencies for each characteristic mode of the propagating electromagnetic field and, thus, the waveguide passband in which only the main TE10 mode is propagating. In practical implementations, for example, for the frequency range of 60-90 GHz, the width of the waveguide T is usually in the range 0.1-0.5 mm, and the length Lwg is only of the order of several millimeters (specific values depend on the dielectric properties of the board, in particular, on effective dielectric constant). Thus, the size of the substrate waveguide is smaller in comparison with traditional metal rectangular waveguides that are filled with air.

In accordance with the non-limiting embodiments of the present technology, the received signal filters (113) and the transmitted signal filters (114) are filters on substrate waveguides and are realized as a group of coupled resonators. Such resonators are formed in the structure of substrate waveguide (158) by a set of via holes.

Figure 7:
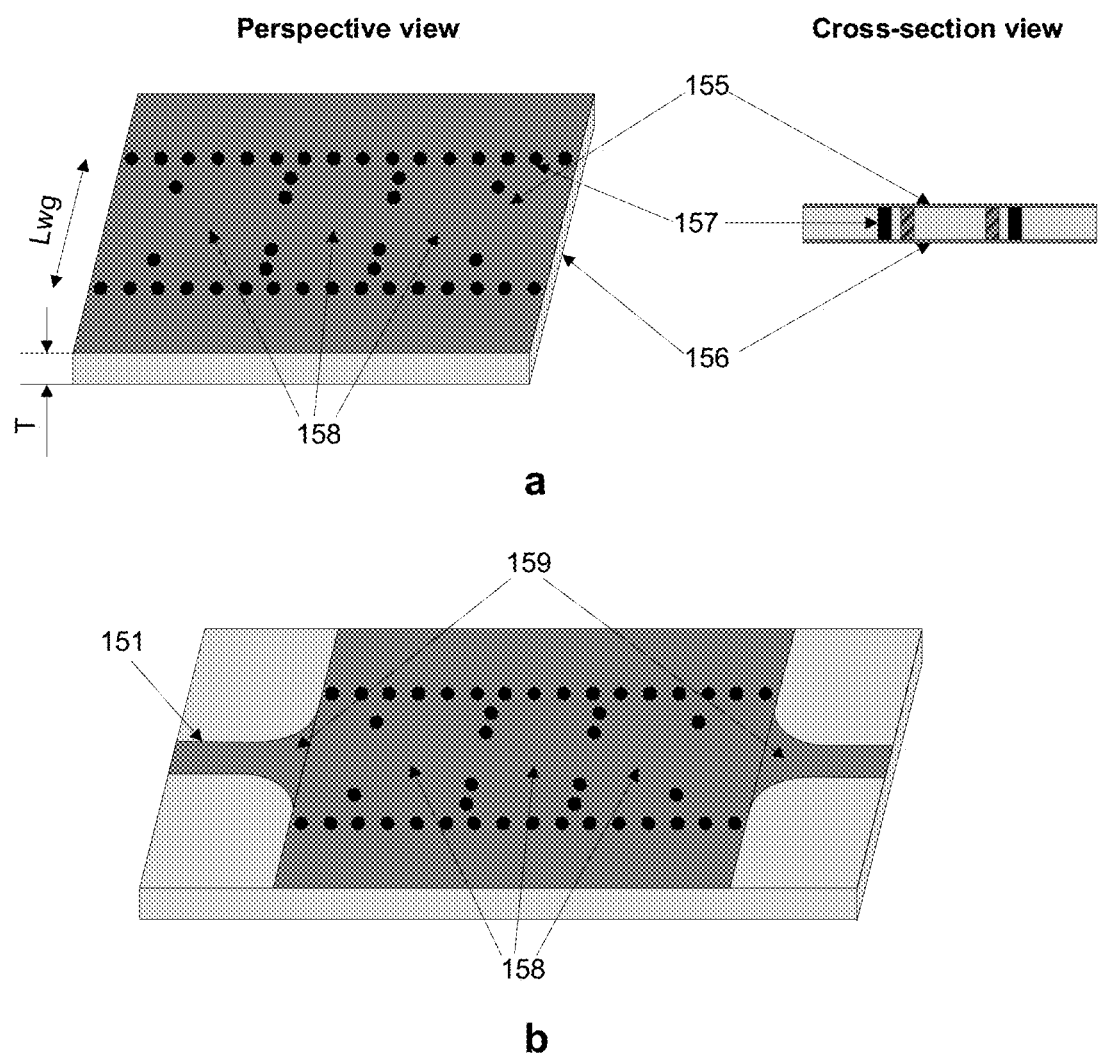
FIG. 7a illustrates a structure of the planar waveguide filter implemented on a dielectric board (prior art)
FIG. 7b illustrates a structure of a planar waveguide filter implemented on a dielectric board with additional transitions to microstrip transmission lines (prior art)

An example of a filter according to this embodiment is shown in FIG. 7(*a*). There are via holes forming coupled resonators in the structure of substrate waveguide. Each resonator is essentially a part of a substrate waveguide channel that is bounded by a set of additional via holes located within the waveguide channel. These additional via holes form partial walls in the waveguide channel with a certain window. A resonance frequency and a quality factor of each resonator are determined by the distance between such holes, and the size of each window. Thus, the equivalent electric resonance wavelength corresponds, in the general case, to twice the length of the resonator. So, the higher quality factor of the resonator the smaller the size of the window in the via holes. Typically, in the case of the considered multi-resonance schemes, the window size and quality factor, as well as the resonant frequencies of each resonator, are selected in the optimization process by means of special software during the electromagnetic simulation. This allows to take into account all the complex effects associated with the interaction of the resonators with each other that cannot be taken into account analytically.

The number of resonators in each filter determines the order of the filter. With the increase in the order of the filter, it is possible to achieve a higher quality factor and isolation in the suppression band, but at the expense of large losses in the pass band.

This is the main reason why substrate waveguide filters providing the required isolation level for a pure frequency duplex communication system also have a high insertion loss. Usually, in millimeter-wave radiocommunication systems, filters with the order between 7 to 14 are necessary to obtain the isolation of 50-100 dB. Reducing the necessary filter isolation is an actual task.

FIG. 7(*b*) shows the structure of the filter on the substrate waveguide in which the input and output of the filter are connected with the transitions from a microstrip line to a substrate waveguide (159). Such transitions to the microstrip line (or, in alternative implementations, to other types of printed lines) are needed to route the signal to various planar radiating elements and to various microwave integrated circuits that form radio frequency units. For example, a microstrip line serves to excite microstrip radiating elements which can be implemented as antenna elements with two independent ports.

Figure 8:
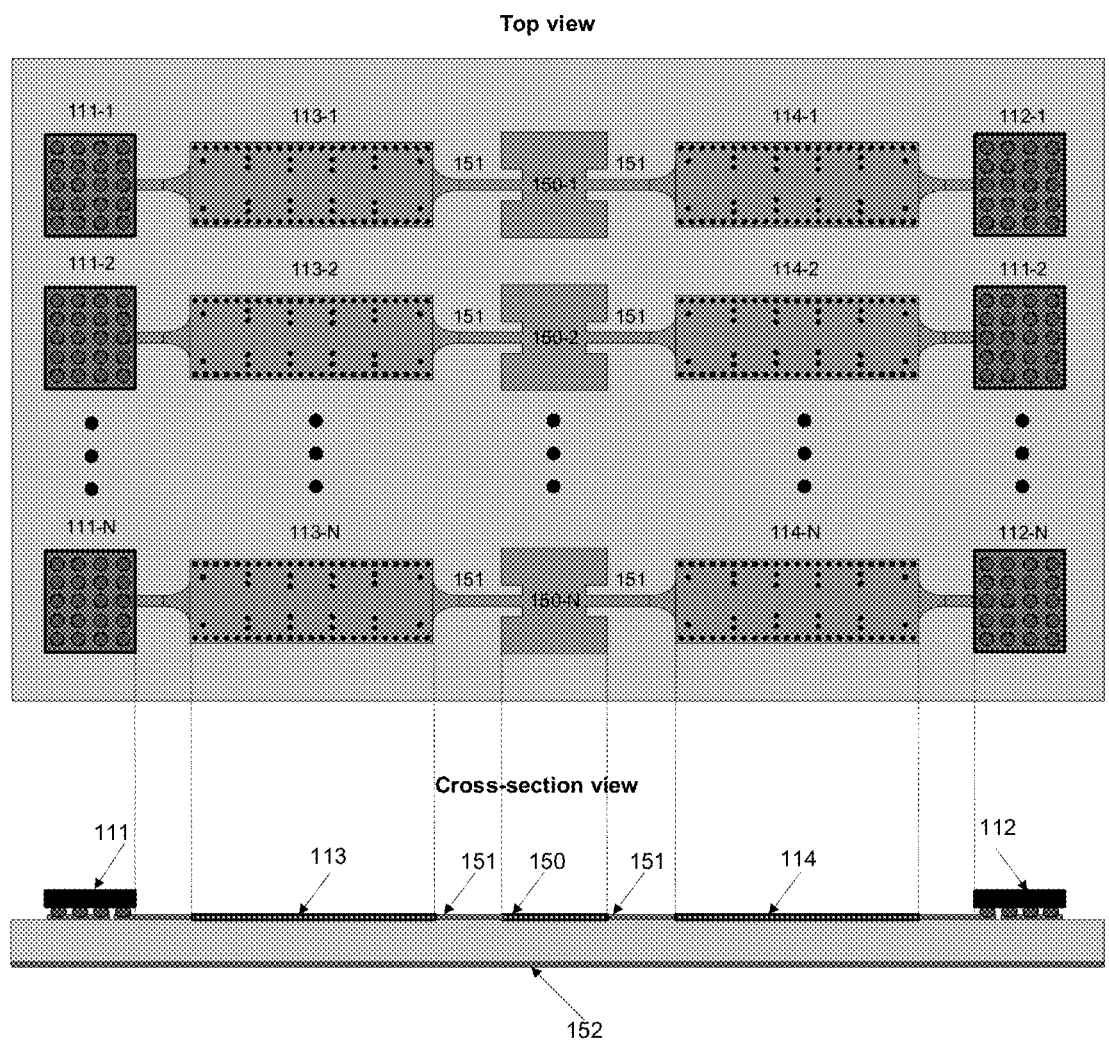
FIG. 8 illustrates a multi-channel radio frequency module implemented on one monolayer dielectric board and based on microstrip radiating elements with a direct signal transmission.

One example of a planar implementation of a multi-channel radio frequency module (100) for a scanning microwave communication station of a millimeter wavelength range is shown in FIG. 8. In this implementation, microstrip radiating elements with two ports (150-1, 150-2, . . . 150-N) with direct signal connection by microstrip lines (151) are used. Microstrip radiating elements are easy to manufacture on a printed circuit board and have good characteristics and are resistant to manufacturing inaccuracies. In addition, the microstrip radiating elements can be simply realized as elements with two ports, as shown in FIG. 8. The impedance matching is provided in this case by planar filters with non-intersecting bands. Thus, it turns out that one of the antenna ports is matched for operation in one frequency band corresponding to the band of the connected filter, and the second port is matched for operation in another band.

In the considered implementation of the multi-channel radio frequency module, all the microstrip radiating elements are made on one dielectric board together with the received signal filters (113-1, 113-2, . . . 113-N) and the transmitted signal filters (114-1, 114-2, . . . 114-N), which are realized as filters on a substrate waveguide. All the received signal filters (113) are located on one side of the radiating elements, and all the transmitted signal filters (114) are on the other. This ensures the best electromagnetic isolation between the received and transmitted signals, propagating each through the corresponding filters.

The embodiment shown in FIG. 8 is the most effective when integrated circuit based radio frequency receivers (111-1, 111-2, . . . 111-N) and radio frequency transmitters (112-1, 112-2, . . . 112-N) are used. In this case, active radio frequency signal processing paths are located on different integrated circuits, spaced apart from each other. At the same time, the degree of integration of functional blocks into the radio frequency receivers (111) and radio frequency transmitters (112) integrated circuits may be different. For example, some of the well-known integrated circuits from Analog Devices are HMC6001 (receiver) and HMC6000 (transmitter). They have the highest degree of integration. The HMC6001 receiver includes a low-noise amplifier, an intermediate frequency mixer, stages of variable gain amplifiers and intermediate frequency attenuators for tuning the signal power, a quadrature baseband mixer, baseband amplifiers, and a heterodyne signal generator in conjunction with an integrated auto-tuning circuit. The transmitter HMC6000 also includes amplifiers, mixers, attenuators and a reference oscillator together with a phase-locked loop system. Therefore, in the construction of radio frequency units, other integrated circuits are not actually required. It requires only a few auxiliary components like resistors, capacitors and also a quartz oscillator for the reference frequency. Using these or similar radio frequency integrated circuits, the implementation of the multi-channel radio frequency module (100) shown in FIG. 8 is the most effective. In this case, the integrated circuits can be installed on the board either with wire-bonding connections or using the flip chip technology. The last recently began to be used in the millimeter wave band—up to 90 GHz—and this installation method is shown in FIG. 8. Analog Devices recently released more effective versions of fully integrated receivers and transmitters—HMC6301 and HMC6300, respectively, dedicated for flip chip installation method.

In the embodiment shown in FIG. 8, the dielectric board is a single dielectric layer with double-sided metallization. For the operating of both microstrip lines and planar waveguides, a ground conducted shield (152) is required at the bottom metallization layer (156). It may not occupy the entire bottom surface of the board to facilitate the routing of control lines in metal-free areas. In general, the board can also be multi-layer, which allows to further reduce the size of the microwave communication device.

Figure 9:
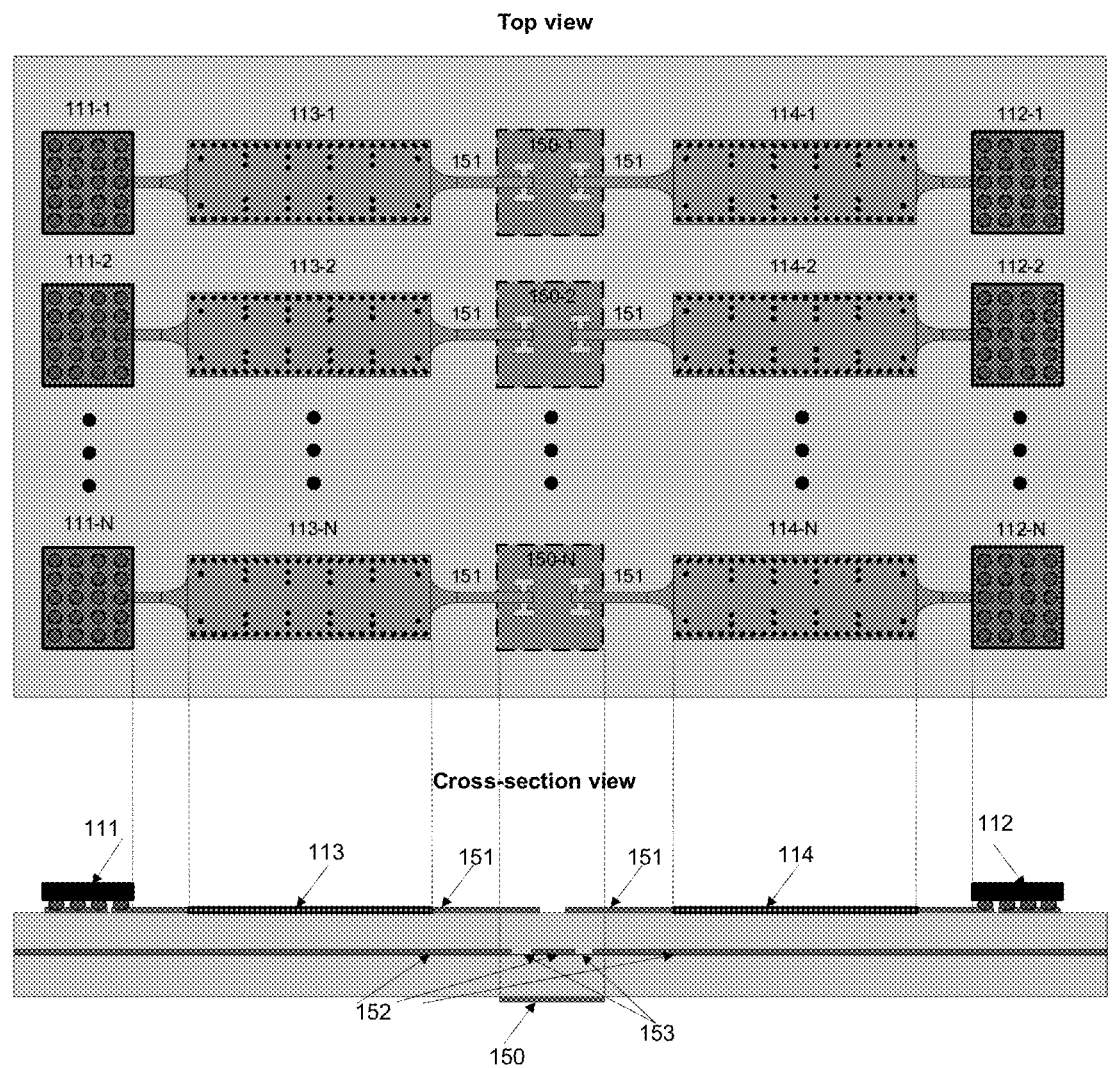
FIG. 9 illustrates a multi-channel radio frequency module implemented on one multilayer dielectric board and based on microstrip radiating elements with slot aperture coupling feeding.

FIG. 9 shows another implementation of the developed multi-channel radio frequency module. The difference from the previous implementation is that in this case the microstrip radiating elements with two ports (150) are fed by the slot aperture. In such an element, a transition microstrip lines (151) are located at the bottom metallization layer (156) of the multilayer board, while narrow slot apertures in a ground plane (153) (having a form of a letter H in this case) are realized in the grounded conducted shield (152) at the inner metallization layer, and the radiating elements with two ports (150) themselves on the top metallization layer (155). The main advantage is in separation of the transmission line and the radiators that allows them to be designed and optimized independently of each other. With these radiating elements the dielectric board should be multilayer in principle (with at least two layers of dielectric and three layers of metal). The received signal filter (113) and the transmitted signal filter (114) are realized between the two upper metallization layers.

In the two examples discussed above (referring to FIG. 8 and FIG. 9), the two ports of each radiating element are used to excite or receive waves of one polarization. And, although it is possible to make these ports frequency-selective, nevertheless, the requirements for filters cannot be significantly relaxed. Because of this, with the planar realization of the filters, significant additional signal loss can occur in the multi-resonance and high-order structure of each filter. These losses are almost entirely dependent on the dielectric loss tangent of the used substrate.

Figure 10:
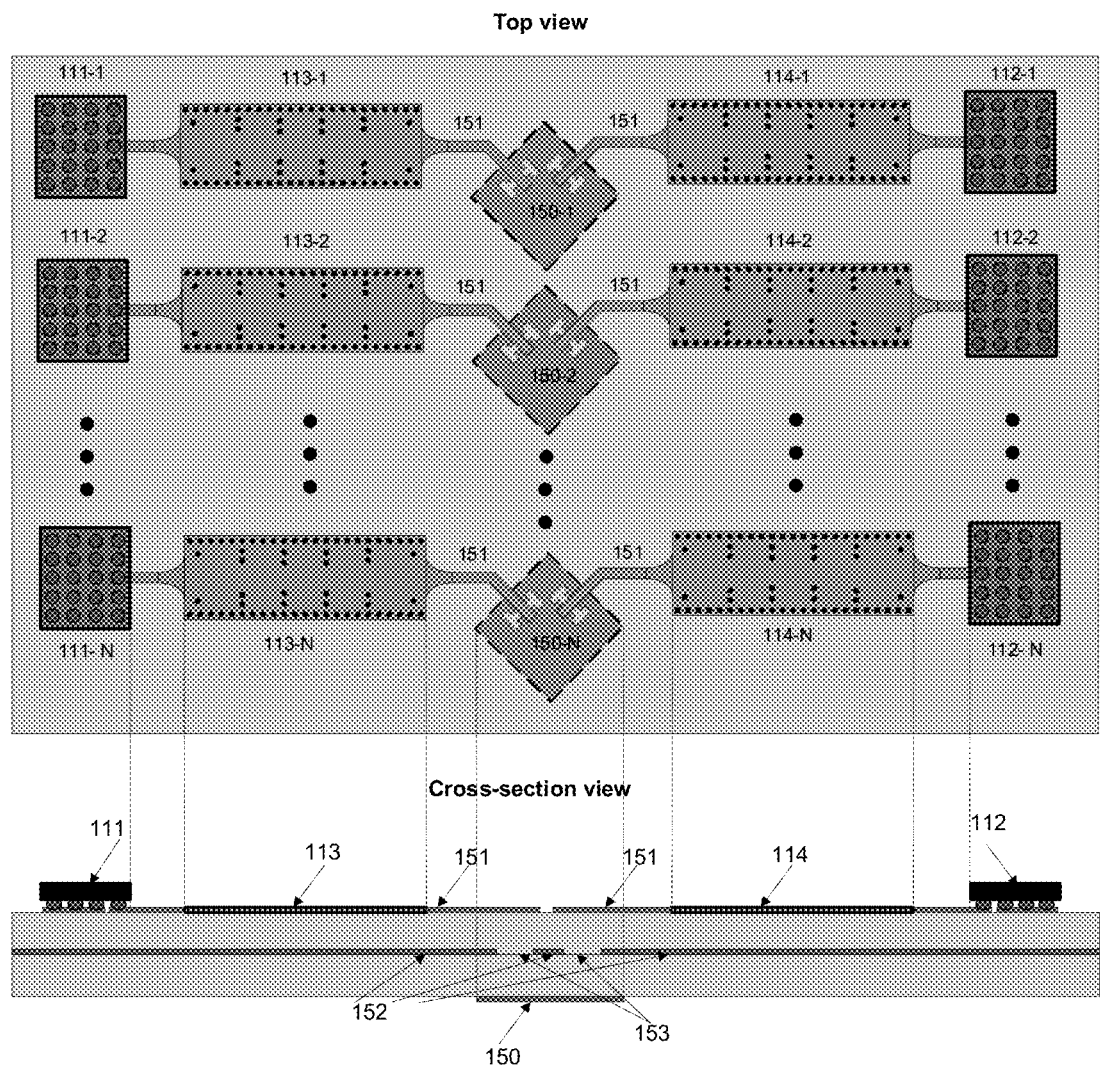
FIG. 10 illustrates a multi-channel radio frequency module implemented on one multilayer dielectric board and based on microstrip radiating elements with slot aperture coupling feeding and with dual polarizations.

To significantly simplify the requirements for filters, it is proposed to use radiating elements with two ports (150), which are designed to work with signals of different polarizations. One embodiment of a multi-channel radio frequency module (100) with such radiating elements with two ports (150) is shown in FIG. 10. Microstrip radiating elements with two ports (150-1, 150-2, . . . 150-N) are also used here, with the signal applied by the slot aperture excitation, however, two microstrip lines (151) are located at right angles to each other. Accordingly, two slot apertures are also located at a right angle. Thus, when these two ports are excited, the radiating element with two ports (150) radiates two waves with two linear polarizations orthogonal to each other. Further, both microstrip transmission lines have a 45 degree turn to simplify board layout and place the filters parallel to each other.

Radiating elements with dual polarizations usually provide a significant level of cross-polarization isolation. This isolation can be in practice of the level of 20-40 dB, and in some cases even more. Thus, frequency duplex filters should provide much less isolation, which leads to a reduction in the number of coupled resonators, losses, as well as an additional reduction in size. In this case, the planar realization is the most effective.

Figure 11:
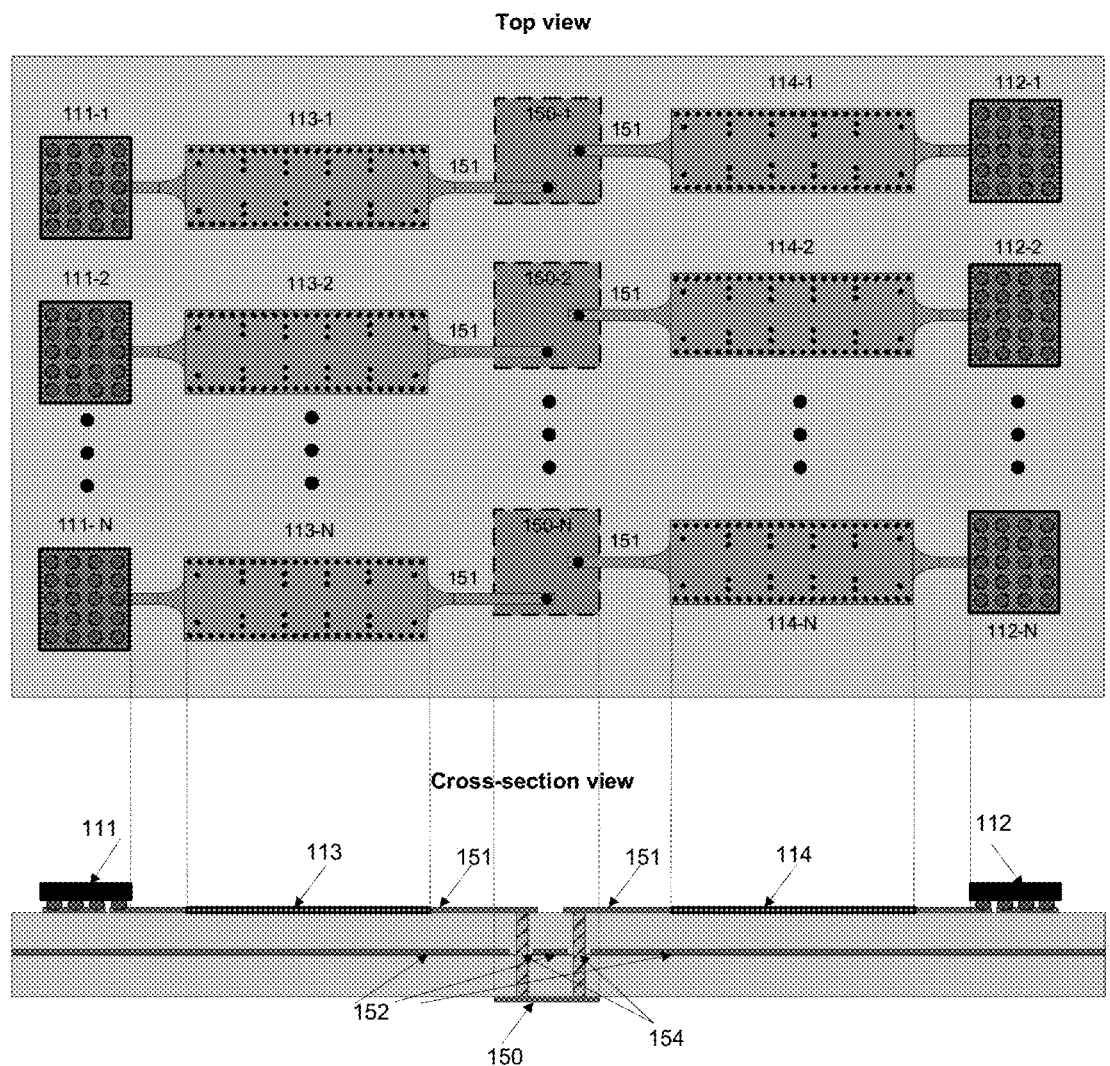
FIG. 11 illustrates a multi-channel radio frequency module implemented on one multilayer dielectric board and based on microstrip radiating elements with coupling feeding using via holes and with dual polarizations.

To avoid the mentioned turns of the transmission lines, it is possible to use via holes in the structure of the radiating element (154). The multi-channel radio frequency module (100) according to this implementation is shown in FIG. 11. The advantage of such radiators is that the polarization of the transmitted or received wave determines not by orientation of the gap as above, but simply by the specific location of the via hole connecting the line and the radiating element. So, if the hole is offset relative to the center of the radiating element in the vertical plane, then the corresponding polarization will also be vertical. If the displacement is in the horizontal plane, then the polarization will be horizontal.

In all implementations shown in FIG. 8-11 the shape of the radiating element is rectangular. However, in other embodiments, the elements may have other shapes, e.g., circular, rectangular, rhomboid, etc. Moreover, they can additionally contain cutouts of various shapes, and additional printed elements can be made adjacent to them with the purpose to expand the antenna passband. In addition, between the radiating elements, as well as around them, rows of shielding via holes can be implemented to increase mutual isolation and eliminate interference.

Figure 12:
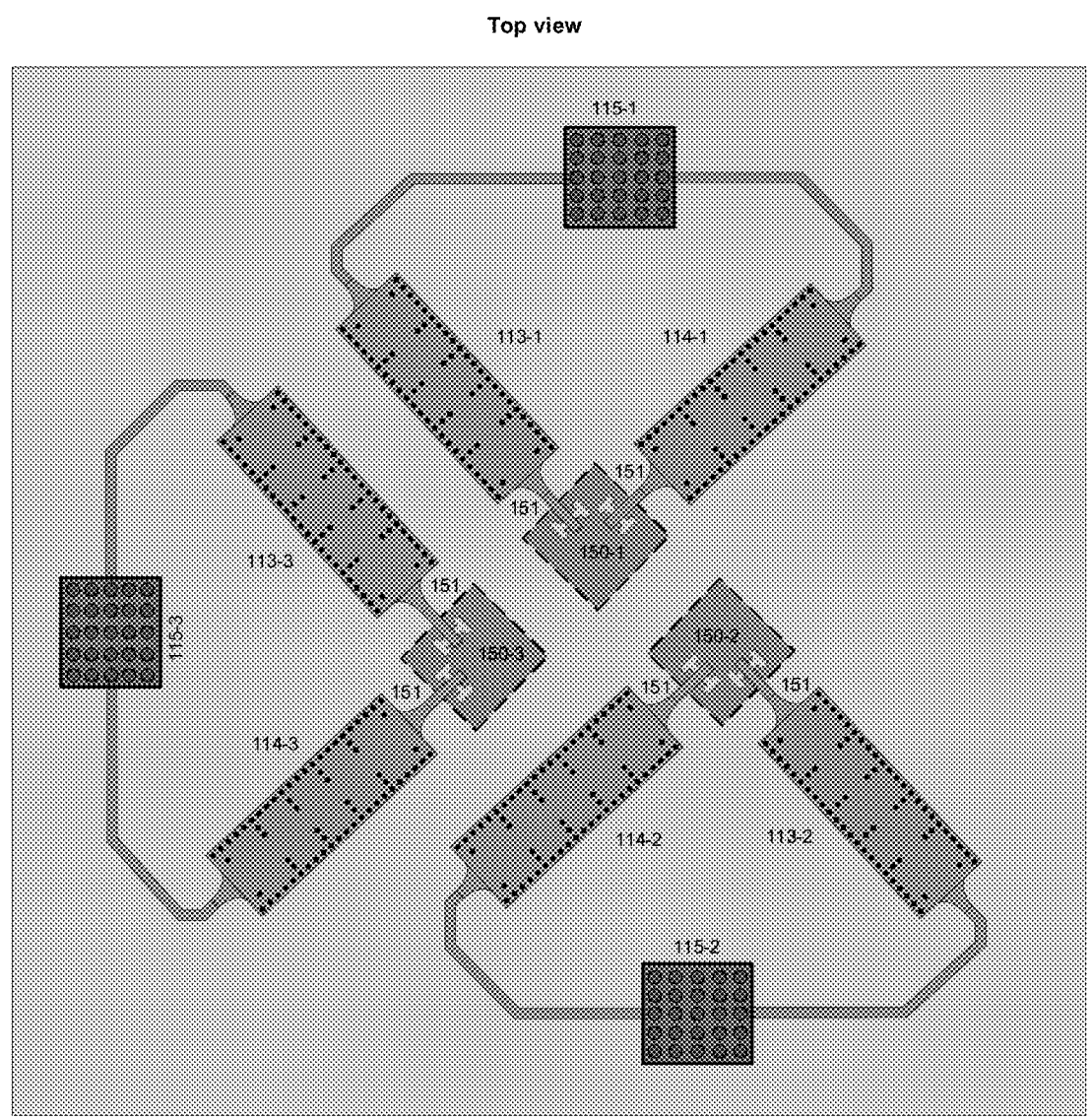
FIG. 12 illustrates a multi-channel radio frequency module implemented on one multilayer dielectric board and based on three microstrip radiating elements with slot aperture coupling feeding and said elements located at the vertices of a triangle.

FIG. 12 shows one more implementation of the disclosed multi-channel radio frequency module (100) for microwave PtP station beam scanning. In this implementation, the multi-channel radio frequency module contains three radiating elements with two ports (150-1, 150-2 and 150-3) located at the vertices of the triangle. All elements have two orthogonal polarizations. The main difference from the previous examples of implementations is that for a single radio frequency module, not individual integrated receiver and transmitter are used, but one integrated radio frequency transceiver (115-1, 115-2 and 115-3). Again, additional auxiliary and discrete components of the low-frequency signal path can be used, but all microwave processing is performed by these radio frequency transceivers (115). An example of such transceivers of the 57-64 GHz, 71-76 GHz and 81-86 GHz bands are BGT60, BGT70 and BGT80 from Infineon Technologies. In each of these transceivers, both the transmit and receive paths are integrated with a direct conversion of the signal to a carrier frequency. The only components required additionally are the reference signal generator and phase-locked loop circuits for the voltage-controlled generator integrated into the BGT. Also, if necessary, separate power amplifiers and low-noise amplifiers between the received signal filter (113) and the transmitted signal filter (114) and the radio frequency transceivers (115) can be added if special functionality is required. Naturally, to provide a duplex mode with a frequency separation of receive and transmission, the integrated circuit must be configured to generate a signal at one frequency and receive at another frequency.

Figure 13:
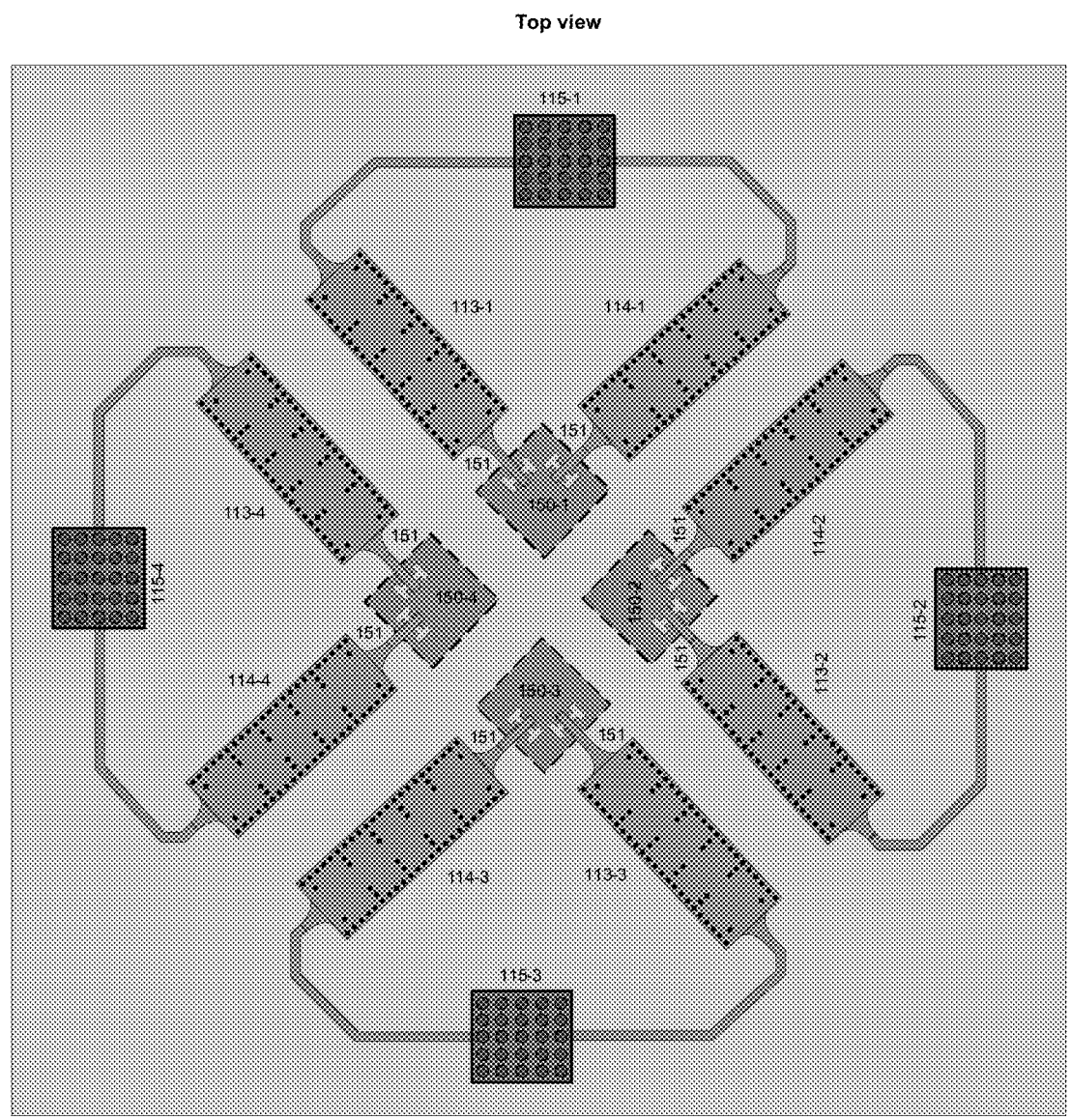
FIG. 13 illustrates a multi-channel radio frequency module implemented on one multilayer dielectric board and based on four microstrip radiating elements with slot aperture coupling feeding and said elements located at the corners of the rectangle.

FIG. 13 shows a similar example of a multi-channel radio frequency module (100), with only four double-polarized microstrip radiating elements. In this case, the elements are located in the corners of a rectangle. The number of elements and their location defines the number of positions of the beam which formed in angle space due to the focusing element (lens, mirror, etc.). Thus, with the two-dimensional arrangement of the radiating elements the beam scanning will be carried out in a two-dimensional angular space, and if placed in a line, only in one-dimensional.

Materials of dielectric boards in all considered implementations can act as various materials of printed and ceramic boards.

As a focusing device, it is most effective to use a hemi-elliptical lens with a cylindrical extension with a focal plane located on its flat base. It is clear that the flat surface of the lens is well suited for mounting a planar board on it with radiating elements adapted for radiation to the lens body. It turns out that the receiver and transmitter are located on the opposite side of the board, which is very convenient.

In one aspect of the non-limiting embodiments of the present technology, a wireless communication device is adapted to operate in the paired frequency range 71-76 GHz/81-86 GHz. In another aspect, the wireless communication device is adapted to operate in the paired band 57-59.5 GHz/61.5-64 GHz. These ranges are allocated in many countries of the world for high-speed microwave systems of the "point-to-point" type. The required isolation level between the transmitter and the receiver in such systems is usually more than 60 dB, which can be effectively achieved in the developed multi-channel radio frequency module.

The developed device for any of the implementations can be adapted for microwave-based point-to-point communication systems with a peak throughput of more than 1 Gigabit per second.

The non-limiting embodiments of the present technology is not limited to the specific implementations, disclosed here for illustrative purposes only and encompasses all modifications and variations within the scope and spirit of the non-limiting embodiments of the present technology as defined by the foregoing claims.

The invention claimed is:

1. A multi-channel radio frequency module with frequency division of data reception and transmission, comprising:
    at least two radiating elements;
    at least two received signal filters, each of them being tuned to pass a received signal within a certain frequency band;
    at least two transmitted signal filters, each of them being tuned to pass a transmitted signal within a certain frequency band;
    at least two radio frequency receivers, each of them being connected to one of the at least two received signal filters; and
    at least two radio frequency transmitters, each of them being connected to one of the at least two transmitted signal filters;
    wherein the at least two radiating elements have different polarizations,
    wherein each of the at least two radiating elements has two input ports in which one of the two input ports is directly connected to the received signal filter, and the other of the two input ports is directly connected to the transmitted signal filter, and
    wherein the passbands of the received signal filter and the transmitted signal filter are configured to be non-overlapping.

2. The module according to claim 1, wherein all the received signal filters and all the transmitted signal filters are made using the technology of planar waveguides.

3. The module according to claim 1, wherein all filters and all radiating elements are made on one high-frequency dielectric board.

4. The module according to claim 3, wherein the high-frequency dielectric board comprises at least two metallization layers.

5. The module according to claim 3, wherein the high-frequency dielectric board comprises at least three metallization layers.

6. The module according to claim 3, wherein a low-temperature or high-temperature ceramic board is used as the high-frequency dielectric board.

7. The module according to claim 3, wherein a printed circuit board is used as the high-frequency dielectric board.

8. The module according to claim 1, wherein the radio frequency receivers and the radio frequency transmitters are configured in at least one semiconductor integrated circuit mounted on the dielectric board.

9. The module according to claim 1, wherein each radio frequency receiver is implemented on one semiconductor integrated circuit, and also each radio frequency transmitter is implemented on a single semiconductor integrated circuit.

10. The module according to claim 1, wherein each pair of radio frequency receiver and radio frequency transmitter is implemented on one semiconductor integrated circuit of the transceiver.

11. The module according to claim 1, wherein the radiating elements are double-polarized, and each of the two ports of each element serves to transmit or receive signals on substantially orthogonal polarizations.

12. The module according to claim 1, further comprises at least one of the following elements: a parabolic mirror with the radiating elements being arranged substantially in the focal plane of the mirror; a thin dielectric lens with the radiating elements being arranged substantially in the focal plane of the lens; a lens with a cylindrical extension with the radiating elements being arranged substantially in the focal plane of the lens, and the dielectric board is mounted on the flat surface of the cylindrical lens extension.

13. The module according to claim 1, further comprises a lens with a cylindrical extension with the radiating elements being arranged substantially in the focal plane of the lens, and the dielectric board is mounted on the flat surface of the cylindrical lens extension, wherein the collimating shape of the lens is selected from a group comprising: a hemi-ellipsoid, a hemisphere.

14. The module according to claim 1, wherein the passbands of all received signal filters are substantially equal to each other, as well as the transmission passbands of all transmitted signal filters are substantially the same.

15. The module according to claim 1, wherein the connection of the radiating elements and filters is performed by microstrip lines by means of appropriate transitions between such a line and the substrate waveguide.

16. The module according to claim 15, wherein the arrangement of the radiating elements is one of the following: at the vertices of the triangle; at the corners of the rectangle.

17. The module according to claim 15, wherein the radiating elements are microstrip antennas of one of the following types: with a direct signal feeding by the microstrip line; with a signal coupling from the microstrip line through a slot aperture in the ground plane located between the radiating element and the transmission lines; with a signal feeding by the microstrip line by means of via holes through a ground conducted shield disposed between the radiating element and the transmission lines.

18. The module according to claim 1, further containing a received signal distribution block connected to the radio frequency receivers and the radio frequency transmitters, a transmission signal distribution block connected to the radio frequency receivers and the radio frequency transmitters, and wherein
    a beam position control module is connected to a digital modem, the received signal distribution block and the transmission signal distribution block through command channels with the possibility of providing command signals to them.

19. The module according to claim 18, wherein the received signal distribution block is a power divider for N outputs, and the transmitted signal distribution block is a power combiner with N inputs.

20. The module according to claim 18, wherein the received signal distribution block and the transmitted signal distribution block are multi-channel switches.

* * * * *